(12) United States Patent
Hopkins et al.

(10) Patent No.: US 8,417,071 B2
(45) Date of Patent: Apr. 9, 2013

(54) DATA STORAGE SYSTEM, A MODULAR PRINTED CIRCUIT BOARD, A BACKPLANE AND A BACKPLANE COMPONENT

(75) Inventors: Kenneth M Hopkins, Chichester (GB); Richard C. Pitwon, Fareham (GB)

(73) Assignee: Xyratex Technology Limited, Havant (GB)

( * ) Notice: Subject to any disclaimer, the term of this patent is extended or adjusted under 35 U.S.C. 154(b) by 303 days.

(21) Appl. No.: 12/785,931

(22) Filed: May 24, 2010

(65) Prior Publication Data

US 2011/0286691 A1 Nov. 24, 2011

(51) Int. Cl.
*G02B 6/12* (2006.01)

(52) U.S. Cl.
USPC ............................. 385/14; 385/39; 385/135

(58) Field of Classification Search ............ 385/14, 385/135, 53, 39, 88; 398/134, 173
See application file for complete search history.

(56) References Cited

U.S. PATENT DOCUMENTS

| | | | |
|---|---|---|---|
| 4,499,607 A | 2/1985 | Higgins | 398/164 |
| 4,807,955 A | 2/1989 | Ashman et al. | 385/88 |
| 4,836,107 A | 6/1989 | Lang et al. | 102/293 |
| 4,850,044 A | 7/1989 | Block et al. | 398/118 |
| 5,007,846 A | 4/1991 | Ravid | 439/79 |
| 5,796,594 A | 8/1998 | Kabat et al. | 361/818 |
| 5,822,475 A | 10/1998 | Hirota et al. | 385/24 |
| 5,930,428 A * | 7/1999 | Irwin et al. | 385/88 |
| 5,938,455 A | 8/1999 | Glovatsky et al. | 439/74 |
| 6,304,690 B1 | 10/2001 | Day | 385/24 |
| 6,464,403 B1 | 10/2002 | Koch et al. | 385/53 |
| 6,623,177 B1 * | 9/2003 | Chilton | 385/88 |
| 7,292,756 B2 * | 11/2007 | Moynihan et al. | 385/49 |
| 7,581,959 B2 | 9/2009 | Christensen | 439/64 |
| 2005/0259993 A1 | 11/2005 | Davies et al. | 398/164 |
| 2006/0072878 A1 | 4/2006 | Dames et al. | 385/47 |
| 2008/0013880 A1 * | 1/2008 | Pitwon | 385/14 |
| 2008/0199132 A1 * | 8/2008 | Pitwon | 385/53 |
| 2008/0247751 A1 | 10/2008 | Lang et al. | 396/542 |

FOREIGN PATENT DOCUMENTS

| | | |
|---|---|---|
| GB | 1 315 028 | 4/1973 |
| JP | 63-291014 | 11/1988 |
| KR | 10-2007-0053520 A | 5/2007 |

* cited by examiner

*Primary Examiner* — Ellen Kim
(74) *Attorney, Agent, or Firm* — Pillsbury Winthrop Shaw Pittman LLP (57) ABSTRACT

The invention provides a component electro-optical printed circuit board backplane for assembly in a modular electro-optical backplane, the component electro-optical printed circuit board backplane comprising: optical channels for the propagation and transmission of optical data signals and electrical channels for the propagation and transmission of power and control signals; connectors for connection in-plane to at least one other component electro-optical printed circuit board; and, at least one socket for receiving, in use, a user circuit. The invention also provides a modular backplane made up of plural such component backplanes.

21 Claims, 8 Drawing Sheets

DATA STORAGE SYSTEM, A MODULAR PRINTED CIRCUIT BOARD, A BACKPLANE AND A BACKPLANE COMPONENT

The present invention relates to a data storage system and a modular printed circuit board such as a backplane for a data storage system and a backplane component for use in a backplane for a data storage system.

As data storage systems increase in size and are arranged to hold an increasing number of storage devices such as hard disk drives, corresponding larger backplanes will be required. Typically a storage system is provided with a frame in the form of a rack arranged to hold the plural storage devices. Large backplanes are needed to support the interconnection of power, storage, controller and other devices across the rack. The backplanes may need to be as high as the racks and therefore potentially many metres in length.

One way by which an appropriately sized backplane could be provided is with the reliable mass-production of printed circuit boards at the required scale. However, mass-production of printed circuit boards on this scale would pose considerable strain on manufacturers. In most cases the equipment would simply not be available to build boards on this scale. If the equipment were available, the board size requirements would incur costly additional fabrication processes to cater for the added weight of the board, additional structural reinforcement and strongly impact yield and therefore the cost of the backplanes.

An alternative solution is the use in the formation or assembly of the large backplane of a number of smaller interconnectable printed circuit boards. This would not incur additional cost from the PCB fabricators as standard sized PCBs can be used. Thus, the large backplane can be constructed by connecting together plural sub-backplanes together, and deconstructed by disconnecting the plural sub-backplanes. When the large or modular backplane is constructed the component or sub-backplanes will need to be electrically and electronically connected in order to convey power, control data and communication bus data across the entire super-backplane. Therefore each of the component- or sub-backplanes will require pluggable electrical and electronic connectors and receptacles.

U.S. Pat. No. 7,581,959 discloses a system of co-planar printed circuit boards that are electrically connected by leveraging an applied external force to generate a higher in-plane PCB connection force. JP-A-63291014 discloses an opto-electronic integrated circuit board device. The device includes six opto-electronic integrated circuit boards of hexagonal one-chip constitution arranged to communicate optically with adjacent opto-electronic integrated circuit board devices.

High speed data will need to be conveyed across the entire assembled backplane. At the prevailing SAS data rates of 6 Gb/s and the anticipated next generation jump to 12 Gb/s, it will become extremely costly to run high speed interconnect across a board of this size. In addition to the prevailing loss-mechanisms of dielectric loss and Skin Effect, which (without active signal conditioners on the backplane) will require very high drive signal powers, the cost of pluggable high RF connectors will be very significant and quite possibly prohibitive in most cases.

According to a first aspect of the present invention, there is provided a component electro-optical printed circuit board backplane for assembly into a modular electro-optical backplane, the component electro-optical printed circuit board comprising: optical channels for the propagation and transmission of optical data signals and electrical channels for the propagation and transmission of control signals; connectors for connection in plane to at least one other component electro-optical printed circuit board; and, at least one socket for receiving, in use, a user circuit.

Electrical channels for low speed bus signals may also be provided. In addition, electrical layers for power distribution may be provided within the component electro-optical printed circuit board.

As used herein the term "modular electro-optical printed circuit board" (or, correspondingly, a "modular backplane") means an electro-optical printed circuit board made up of plural component electro-optical printed circuit boards. A "component electro-optical printed circuit board" is a component for use in the formation of a modular electro-optical printed circuit board. In other words, the component electro-optical printed circuit board is a building block for use in the formation of a (larger) modular PCB.

A modular electro-optical backplane is thus provided which overcomes the problems discussed above associated with providing backplane functionality to data storage systems of increasing size. Whereas previously it would have been extremely difficult technically and economically to provide an electro-optical backplane for a data storage system when above a certain size (and increasingly more difficult as the size increases), the modular system provided by the present invention is easy and convenient to manufacture and assemble and is, by its modular nature, scalable. Therefore, as the required size increases further the present system will still be effective.

In an embodiment, the connectors include: electrical connectors to enable power distribution and transmission of control signals and/or low speed bus signals between the component electro-optical printed circuit board and the at least one other component electro-optical printed circuit board to which in use it is connected; and; optical connectors to enable transmission of data signals between the component electro-optical printed circuit board and the at least one other component electro-optical printed circuit board to which in use it is connected.

The present invention, in an embodiment, thus provides a component electro-optical printed circuit board for assembly in a modular electro-optical printed circuit board in which high speed optical data channels and low speed electrical connectors are provided. The present system addresses the problems outlined above by providing a modular optical backplane system that ensures that the cost of the pluggable high RF connectors along with a significant increase in the power consumption of electronic signal drivers can be avoided whilst also ensuring the ease and cost-effectiveness of manufacture since individual units are manufactured instead of the entire large assembly. A user can simply assemble the modular backplane or super-structure on-site.

In order to overcome the cost and performance burdens of conveying >6 Gb/s data rates across copper transmission lines many metres in length, embedded optical interconnect are preferably used which provide a cost-effective alternative. In addition the use of optical interconnects is significantly more scalable in terms of density and data bandwidth. Typically, as compared to conventional copper tracks on a PCB, optical waveguides, such as multilayer polymeric waveguides, are able to provide 36 times the density of copper transmission lines.

In an embodiment, the electrical connectors are low speed connectors and/or the optical connectors are high speed connectors i.e. >6 Gbps and preferably >12 Gbps. Currently, speeds of up to 6 Gb/s are used on data storage midplanes as part of the Serial Attached SCSI (or SAS) protocol. As data transfer rates and volumes increase, it is expected that speeds of 12 Gb/s and greater will be used.

In an embodiment, there are provided connectors for connection in plane to at least two other component electro-optical printed circuit boards.

In an embodiment, the connectors are arranged in use to connect directly to connectors on one or more adjacent component electro-optical printed circuit boards.

In an embodiment, the connectors are arranged in use to connect via connection bridges to connectors on one or more adjacent component electro-optical printed circuit boards.

In an embodiment; the optical connectors are passive optical connectors.

In an embodiment, the optical connectors are active optical connectors.

In an embodiment, the component PCB is substantially rectangular and optical and/or electronic connectors are provided on all four sides of the component PCB.

In an embodiment, the component PCBs are substantially rectangular and both optical and electrical connectors are provided on only two adjacent sides of the component PCB.

In an embodiment, the connectors are arranged so as to enable formation of a two-dimensional array of component electro-optical printed circuit boards.

There is a manufacturing limit to how thick a given PCB can be made, i.e. how many layers it can have. In one embodiment, layers of PCBs are stacked in parallel, so there is provided a 3D array of component PCBs. The bridges and/or connectors between individual or "layers" of PCB in this case would preferably plug in orthogonally.

In an embodiment, the connectors are arranged so as to enable formation of a three-dimensional array of component electro-optical printed circuit boards.

According to a second aspect of the present invention, there is provided a storage assembly, comprising: a holding rack arranged to receive plural storage devices; a backplane arranged to interconnect the plural storage devices when received in the storage assembly, wherein the backplane is a modular backplane made up of plural component optical printed circuit bards, each of which is a component electro-optical printed circuit board backplane according to the first aspect of the present invention.

According to a third aspect of the present invention, there is provided an electro-optical printed circuit board backplane, comprising plural component electro-optical printed circuit board backplanes according to the first aspect of the present invention, in which the electrical and optical connectors of one of the component electro-optical printed circuit boards are connected respectively to the electrical and optical connectors of another one of the component electro-optical printed circuit board backplanes.

In an embodiment, at least two of the adjacent plural component electro-optical printed circuit boards are connected to each other directly.

In an embodiment, at least two of the adjacent plural component electro-optical printed circuit boards are connected to each other with a connecting bridge.

In an embodiment, the bridge is an in-plane bridge or an out-of-plane bridge.

According to another aspect of the present invention, there is provided a component electro-optical printed circuit board, such as a backplane, for assembly in a modular electro-optical printed circuit board, the component electro-optical printed circuit board comprising: optical channels for the propagation and transmission of optical data signals and electrical channels for power distribution and the propagation and transmission of control signals; connectors for connection in-plane to at least one other component electro-optical printed circuit board, wherein the connectors include electrical low-speed connectors to enable transmission of control signals between the printed circuit board and the at least one other component electro-optical printed circuit board to which in use it is connected; and optical high speed connectors to enable transmission of data signals between the component electro-optical printed circuit board and the at least one other component electro-optical printed circuit board to which in use it is connected.

In one embodiment, the embedded optical waveguides could for example comprise optical fibres laminated into the boards or preferably optical ridge waveguides (polymer or glass) fabricated onto the PCB.

In one embodiment, the component electro-optical printed circuit board comprises connectors for connection in-plane to at least two other component electro-optical printed circuit boards.

In one embodiment, the connectors are arranged in use to connect directly to connectors on one or more adjacent component electro-optical printed circuit boards.

In one embodiment, the connectors are arranged in use to connect via connection bridges to connectors on one or more adjacent component electro-optical printed circuit boards.

In one embodiment, the optical connectors are passive optical connectors. They may alternatively be active optical connectors.

In one embodiment, the component PCB is substantially rectangular and both optical and electrical connectors are provided on all four sides of the component PCB.

In one embodiment, the component PCBs are substantially rectangular and both optical and electrical connectors are provided on only two adjacent sides of the component PCB.

In one embodiment, the connectors arranged so as to enable formation of a two-dimensional array of component electro-optical printed circuit boards.

According to another aspect of the present invention, there is provided a component electro-optical printed circuit board, such as a backplane, for assembly in a modular electro-optical PCB, the component electro-optical printed circuit board comprising: optical channels for the propagation and transmission of optical data signals and electrical channels for the propagation and transmission of control signals; connectors for connection orthogonally to at least one other component electro-optical printed circuit board. Preferably, the component electro-optical printed circuit board is a component backplane and includes at least one socket for receiving, in use, a user circuit.

In general, it is understood that there are intrinsic fabrication limitations on the number of layers a PCB can have. The present arrangement enables the problems presented by this limitation to be overcome. A structure made up of plural layers of component PCBs may be formed whereby orthogonal connectors provided on component PCBs enables the PCBs to be easily and conveniently interconnected.

In one example, orthogonal connectors are provided on both major surfaces. In other words the orthogonal connectors may be provided on the "top" and "bottom" of a component PCB such that it can be connected to one other component PCB above it and one below it too. In some cases orthogonal connectors are only provided on one side of the component PCB. Such a component PCB will be intended for use as the top or bottom layer within the multilayer superstructure.

Providing an orthogonal connector on both the "top" and "bottom" of a component PCB enables the component PCB to be an intermediate layer between at least two other layers within the super structure.

In one embodiment, the orthogonal connectors comprise one or more of electrical, electronic, optical connectors and/or electro-optical bridges.

Preferably, the component electro-optical printed circuit board comprises one or more connectors for connection in plane to at least one other component electro-optical printed circuit board. Thus, a three dimensional array of electro optical PCBs can be easily and scalably constructed.

Embodiments of the present invention will now be described in detail with reference to the accompanying drawings, in which.

Before describing in detail examples of embodiments of PCBs it is pointed out that where terms such as "upward", "downward", "up", "down" etc. are used these are in reference to the layout of the examples shown in the Figures. They are clearly not limiting and can be interpreted as relating to relative positions of the components described as shown in the accompanying Figures.

Figure 1:
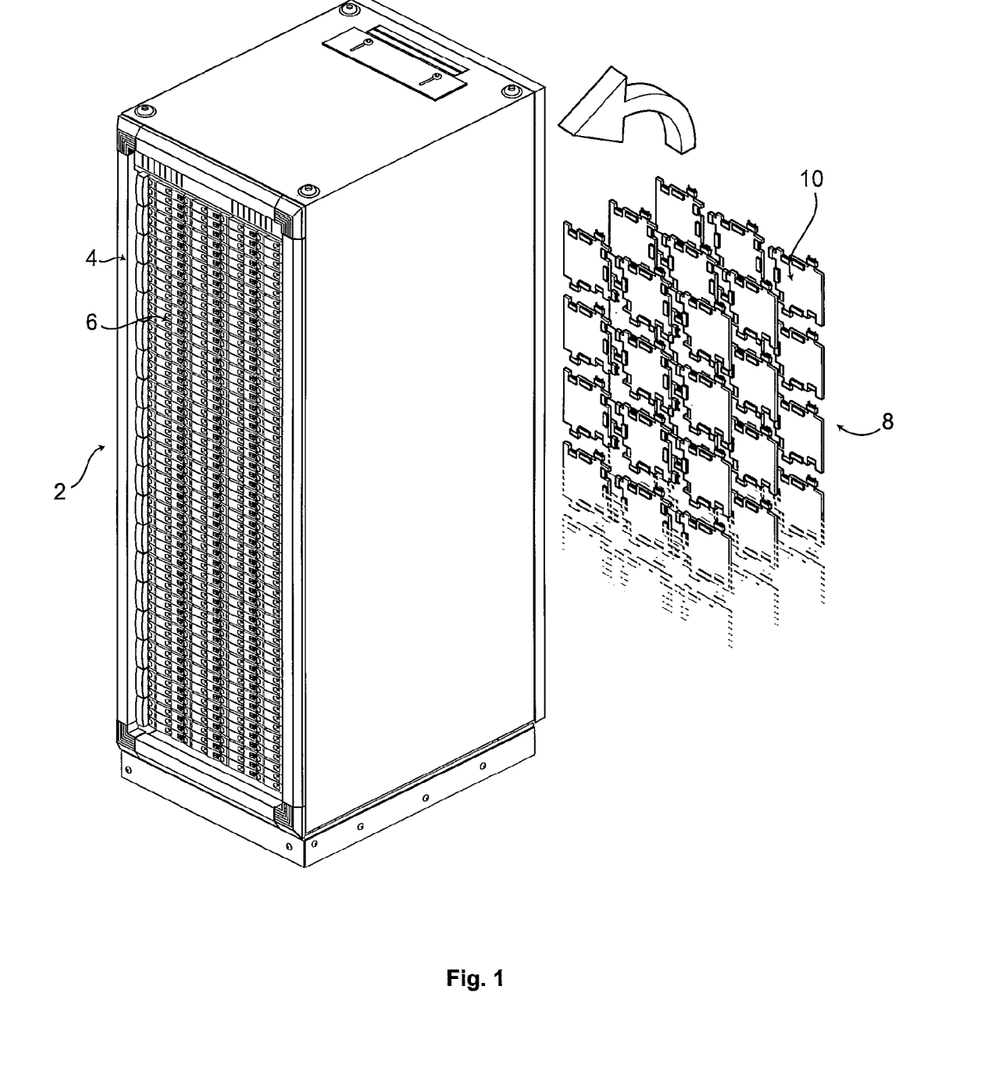
FIG. 1 is a schematic representation of a storage assembly.

FIG. 1 is a schematic representation of a data storage system. As can be seen, the storage rack 2 comprises a frame 4 in the form of a rack arranged to hold plural storage devices 6. Some means is required to enable communication between different ones of the storage devices and also between the storage devices and one or more input or output units (not shown). Communication with the storage devices from the input or output units may be via a midplane which is also not shown. A modular electro-optical PCB backplane 8 is provided for arrangement within the housing 4. In this example, the PCB backplane 8 would be provided at the back surface of the housing, i.e. the out facing surface in FIG. 1.

By providing a modular electro-optical PCB backplane 8, the difficulties associated with manufacturing a single large PCB are avoided. In addition, the use of optical waveguides within the modular PCB backplane 8 ensures that the problems associated with electrical connection and signal propagation across a large electrical PCB are avoided. As the size of data storage systems increases there will be a need for larger backplanes. The system disclosed herein of using component electro-optical backplanes in the formation of a larger modular electro-optical backplane provides a means by which a larger electro-optical backplane can easily and reliably be made whilst avoiding the problems identified above.

Figure 2:
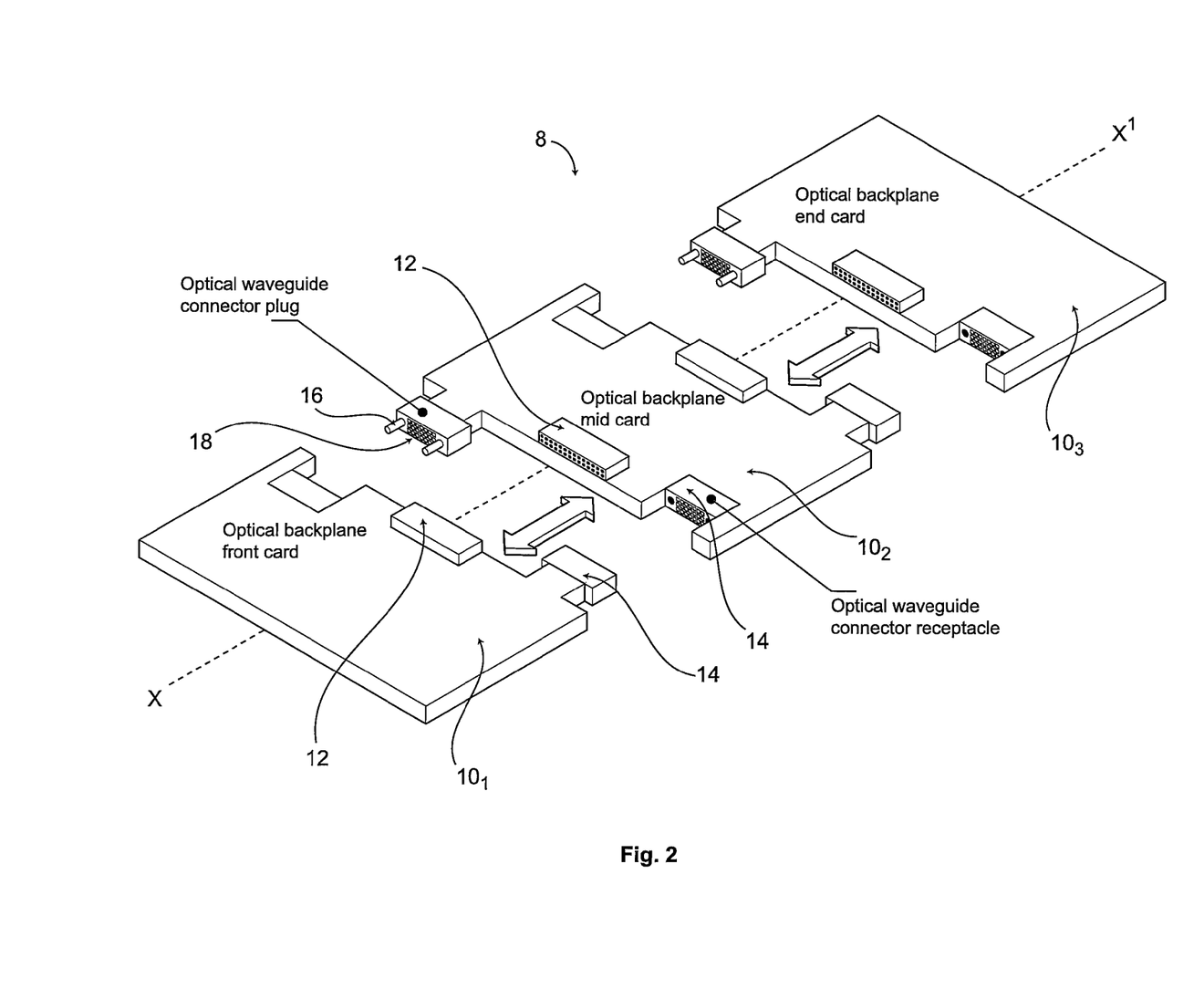
FIG. 2 is a schematic representation of an optical PCB.

FIG. 2 shows a schematic representation of an electro-optical PCB 8 comprising three separate component PCBs $10_1$, $10_2$ and $10_3$. In this example, the component PCBs $10_1$ to $10_3$ are arranged for connection by movement in a single direction, i.e. in the direction of the axis XX'. The electro-optical PCB 8 is a one-dimensional array. As will be explained below with reference to FIG. 3, it is possible that an arrangement be provided in which cooperation in more than one dimension may be achieved, i.e. a two dimensional array of component. PCBs may be assembled to form a single large modular PCB. In the example of FIG. 1 clearly, the component circuit boards 10 are arranged to build up the composite assembly 8 in two dimensions so as to form a circuit board made up of a two-dimensional array of component circuit boards 10, sized to fit the required dimensions of the storage rack 2. In the case of a two-dimensional array of component PCBs preferably there are connections between component circuit boards in both dimensions. In other words, the two-dimensional array is not simply a collection of one-dimensional arrays of component PCBs arranged adjacent to each other but communication between the one-dimensional arrays is also enabled.

The component circuit boards $10_1$ to $10_3$ comprise electrical connectors 12 which are typically provided for low speed control signals and possibly also data signals. In addition, high-speed optical connectors 14 are provided on the component circuit boards in such a way as to enable optical signals to be transmitted between the respective pairs of adjacent component circuit boards $10_1$ to $10_3$. Typically, speeds of, say, >2 Gb/s may be considered as high speed and speeds of <1 Gb/s may be considered low speed.

Each of the component circuit boards $10_1$ to $10_3$ includes optical signal carriers (not shown). These might be of any suitable form. Examples include embedded optical waveguides such as optical fibres laminated onto the boards $10_1$ to $10_3$ or in a preferred embodiment, optical ridge waveguides made of polymer or glass fabricated onto or in the PCB. It will be appreciated that any suitable form of optical signal carrier may be provided. Typically, the material of the component PCBs $10_1$ to $10_3$ is a conventional PCB material such as FR4 on which is provided optical layers for the optical signal carriers. Some connector applications may have need of a flexible substrate so sometimes it may be appropriate to fabricate the optical channels on a flexible substrate such as polyimide.

In the example of FIG. 2, each of the component PCBs $10_1$ to $10_3$ has a specific position to take within the overall assembly given the configuration of the connectors. The left most component PCB $10_1$ is the front card, the central component PCB $10_2$ is the optical backplane mid-card and the right most component PCB $10_3$ is the optical backplane end card. It will be appreciated that one or more sockets (not shown) or other means of connection may be provided on some or all of the component. PCBs to enable a user circuit such as a hard disk drive to be connected to the component PCB and consequently to the modular electro-optical printed circuit board.

The optical connectors 14 are typically provided in the form of optical waveguide connector plugs and include alignment features 16 to ensure that, upon engagement with the connector on an adjacent component optical PCB, the optical interface on the respective connectors are appropriately aligned. In some examples, the connectors include MT or MPO ferrules.

In one example, the optical connectors are provided with a degree of flexibility so as to enable movement in the plane of the PCB or indeed planes transverse to the plane of the PCB such as to ensure accurate alignment and registration with the optical interfaces on adjacent PCBs.

The precise form of the optical connectors may be selected so as to provide the desired functionality. In a preferred example, the connectors are of the form disclosed in on of our corresponding U.S. Pat. No. 7,454,097, U.S. Pat. No. 7,422,374 and U.S. Pat. No. 7,625,134, the entire contents of all of which are hereby incorporated by reference.

In the system of U.S. Pat. No. 7,422,374, an optical printed circuit board is provided with an optical connector provided at an edge thereof. The circuit board comprises a support layer composed of a number of FR4 layers interspaced with plural conductive, e.g. copper, layers. Arranged on the top surface of the circuit board, there is provided a flexible polymer layer such as a polyimide flex with an optical layer arranged thereon. At an edge of the printed circuit board, the support layers are removed to leave the flexible polyimide with the optical layer arranged thereon. A suitable housing may then be coupled to this flexible region to enable interface between the optical waveguides and an optical interface on another component printed circuit board. One or more rigid struts may be provided with buffers to enable movement of the housing relative to remainder of the printed circuit board.

In the system of U.S. Pat. No. 7,454,097, an optical printed circuit board is provided in which the circuit board is formed on a base layer which may be a conventional rigid PCB material such as FR4 or a composite structure of FR4 layers and conductor layers e.g. copper layers. In fact, any suitable rigid support material can be used so long as it is suitable for forming a PCB. In one particular example disclosed in U.S. Pat. No. 7,454,097, the rigid support layer is formed of a composite structure of copper layers and FR4 layers. Provided on the top layer of the FR4 layer, there is provided a flexible PCB material, such as Kapton Polyimide. The flexible layer extends further than the rigid layer such that there is a region of exposed flexible material.

During manufacture, one or more optical waveguides are preferably formed extending along the flexible layer within the region of exposed flexible material. The waveguides thus enable optical signals to be coupled from some location within a remote region of the circuit board to the connector. Again, to provide some degree of mechanical support to the connector, a rigid strut is provided that connects at one end via a spring buffer to a connector block and at its other end to some anchor on the printed circuit board.

The connector of U.S. Pat. No. 7,625,134 generally comprises an optical interface, e.g. a photonic interface, that in use is aligned with a waveguide or waveguides of an optical backplane e.g. an electro-optical PCB to enable optical communication between the photonic interface and the electro-optical PCB. In a multiple waveguide arrangement, simultaneous alignment of the parallel optics within the photonic interface with all the waveguides is achieved. The optical interface may be an active or a passive photonic interface for transmitting and receiving light signals. A housing is provided that surrounds components of the connector. The housing is preferably a rigid structure that provides physical protection to the components of the connector. The photonic interface is also in communication with another component PCB so that the connector enables communication between the other component PCB and the optical backplane. As in all embodiments of the present system, the optical interface may include one or more lenses to image or illuminate light passing through it. By providing an imaging lens or lenses optical coupling to a small waveguide is improved as all light is imaged into a small image point.

Referring again to FIG. 2, the optical connectors 14 might be passive or active connectors. If they are passive, then they merely serve to transmit and/or receive optical signals and allow them to propagate onwards. In the case of active connectors, the connectors are arranged to receive electrical signals and convert them to optical signals or vice versa.

It will be appreciated that using the modular system disclosed herein it is possible to produce a predetermined size of modular electro-optical printed circuit board at lower cost than if it were made using a conventional scaled up manufacturing technique. This is because the large PCB can simply be made using modular component PCBs whist still maintaining all optical and electrical functionality. In addition, the system is flexible in that it is scalable. The resultant modular electro-optical printed circuit board or super-backplane 8 can be of any desired size, simply determined by the number and/or dimensions of component PCBs used in its assembly.

Figure 2A:
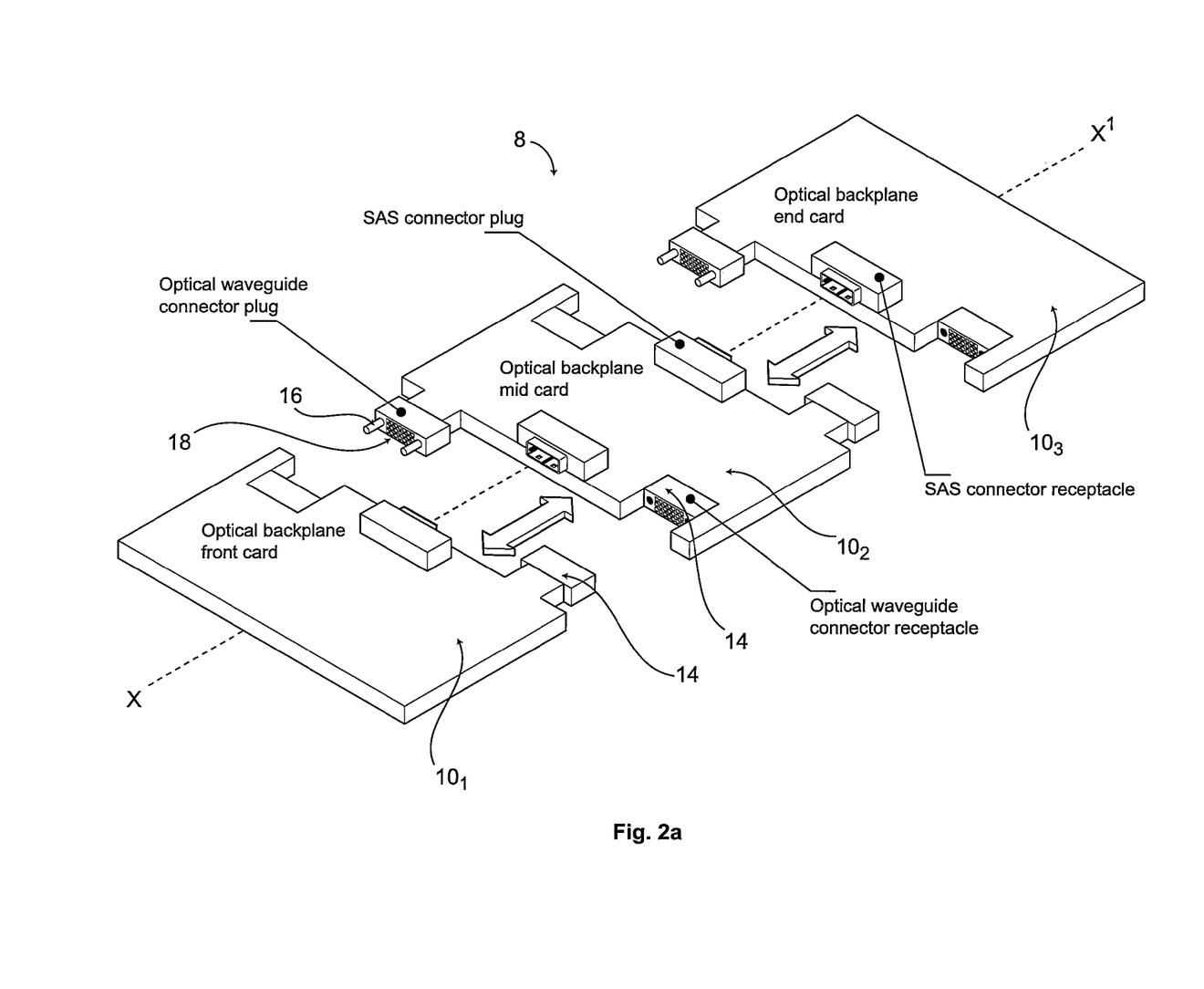
FIG. 2a is a schematic representation of an optical PCB.

FIG. 2a is a schematic representation of an optical PCB similar in construction to that of FIG. 2. In this example, SAS connectors and receptacles are provided on some or all of the component PCBs within the super-structure to enable SAS connectivity between adjacent and other component PCBs.

Figure 3:
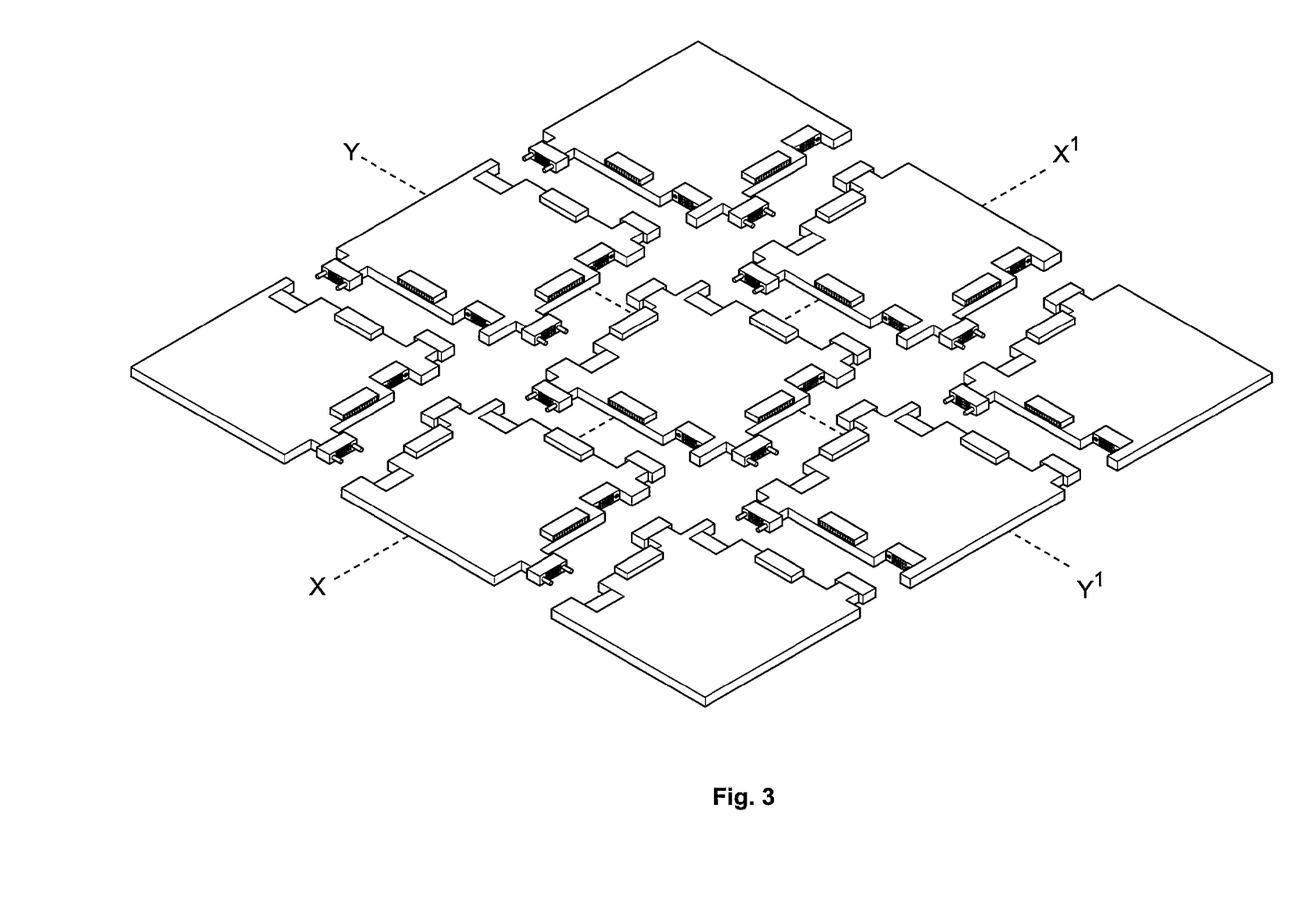
FIG. 3 is a schematic representation of an optical PCB.

FIG. 3 is a schematic representation of an optical PCB made up of plural component PCBs. As can be seen the arrangement of FIG. 3 is as a two-dimensional array of component PCBs extending in two orthogonal directions as represented by the axes, XX' and YY'. The component PCBs may be component PCBs as shown in and described above with reference to FIGS. 2 and 2A.

In embodiments, the system provided herein is one in which a number of electro-optical sub-backplanes or component PCBs are connected together to form a modular electro-optical printed circuit board or electro-optical super-backplane which can meet the size and performance requirements of a rack-scale data-centre. In particular, it is preferred that each electro-optical sub-backplane will contain one or more passive optical connectors and one or more passive optical receptacles. These are in-plane connectors in that the direction of all the optical connections will occur in the plane of the backplanes. Preferably, the connectors and receptacles are provided on the edge of the component or sub-backplanes.

In a preferred embodiment connectors are provided on two or more edges of a first component PCB so that the first component PCB can be used to form a modular electro-optical printed circuit board or super-backplane in which further component PCBs are connected to at least two sides of the first component PCB. In one example connectors are provided on exactly three sides of a component PCB. The number of sides of a component PCB provided with connectors may typically be determined by the position within the larger PCB structure that the component PCB is expected to fit.

In one example, the component PCBs are substantially rectangular and connectors (both optical and electrical) are provided on all four sides of the component PCB. In another example, the component PCBs are substantially rectangular and connectors (both optical and electrical) are provided on only two sides of the component PCB. The connectors are preferably provided on adjacent sides defining one corner of the substantially rectangular PCB so as to function as a corner of a modular electro-optical printed circuit board or super-backplane.

As explained above, where the modular electro-optical printed circuit board is a backplane it will be appreciated that one or more sockets (not shown) may be provided on some or all of the component PCBs to enable a user circuit such as a hard disk drive to be connected to the component PCB and consequently to the modular electro-optical printed circuit board. The sockets might be standard SAS or SATA sockets or any other type of socket in dependence on the type and required functionality of the attached user circuits.

Figure 4:
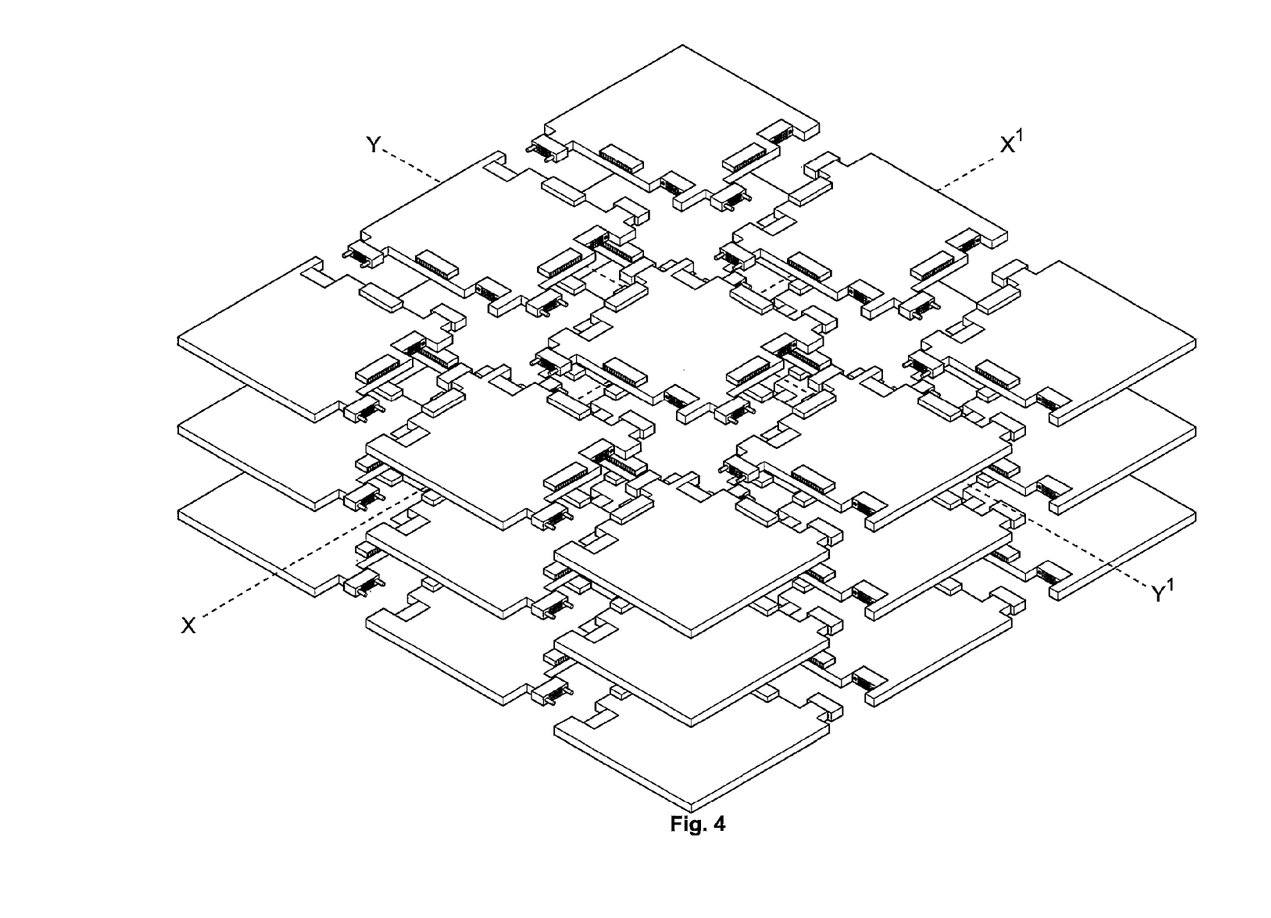
FIG. 4 shows an example of a PCB assembly made up of plural PCBs such as that shown in FIG. 3
FIGS. 5A to 5D show schematic representations of bridges for use in connecting electro-optical PCBs.

FIG. 4 shows an example of a PCB assembly made up of plural PCBs such as that shown in FIG. 3. Suitable connectors for enabling connection in such a three-dimensional array will be described below with reference to FIGS. 6 and 7. However, in general, as explained above, there is a manufacturing limit to how thick a given PCB can be made. The present example enables layers of PCBs to be stacked in parallel.

Figure 5:
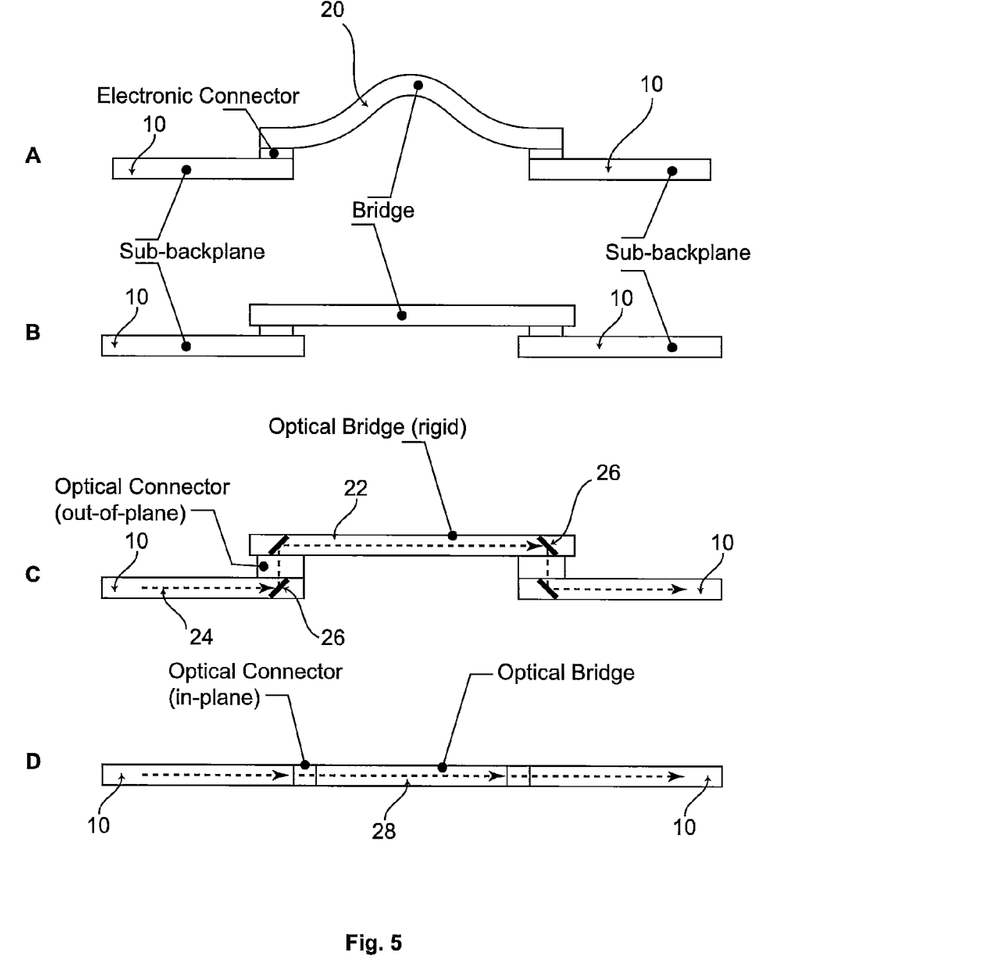

FIGS. 5A to 5D show a schematic representation of bridges that could be used to connect two component printed circuit boards. Referring to Figures A and B, a purely electrical arrangement is shown a bridge 20 is provided to connect two adjacent electronic PCBs 10. In FIG. 5A, the bridge is in the form of a flexible electrical cable 20. In FIG. 5B, the bridge is in the form of an additional PCB. Thus, it will be appreciated that where there are three connected component PCBs, the central or mid PCB may be thought of as a bridge connecting the other two together.

In FIGS. 5C and 5D, an electro-optical bridge is shown. FIG. 5C shows two component electro-optical PCBs 10 connected by an optical bridge 22. The bridge is an out-of-plane connector in that optical signals 24 propagating from one of the component electro-optical PCBs 10 to the other is directed out of the plane of the component PCBs by a redirecting component 26 and then via the bridge, and redirected again back into the plane of the second component electro-optical PCB. The redirecting components may be mirrors, gratings or any other appropriate components.

FIG. 5D shows a further embodiment in which an in-plane optical connector is provided. In this case, there is no need for the use of redirecting elements 26 since the electro-optical bridge 28 is in plane with the component electro-optical PCBs 10 such that light may travel directly from one of the component electro-optical PCBs to the other via the bridge without encountering any redirecting element. This is preferred since such redirecting element can be lossy. In the present case, when considering an in-plane optical connector, it will be appreciated that the optical bridge 28 could in fact be flexible such that strictly speaking light moves out of the plane of the PCBs 10 but since it is not redirected by a redirecting element 26, it would still be considered an in-plane connector since the signal would remain substantially in-plane at the junction between the component electro-optical PCBs and the bridge.

The bridges of FIGS. 5C and 5D could also contain electrical connectors and serve as electro-optical bridges. In other words, they could be flexible electro-optical PCBs with electrical and optical connectors arranged on them, e.g. multi-layer polyimide substrate with optical and copper layers.

Thus, in embodiments, there is disclosed a use of short co-planar electro-optical bridges which typically comprise an electro-optical PCB employed instead of direct connectors, to connect together multiple component electro-optical PCBs or sub-backplanes which are located close to each other but for some reason or other are not directly attached to each other. The resultant structure would be a modular printed circuit board such as a modular electro-optical printed circuit board. Functionally, this collection of co-planar boards and/or backplanes would satisfy the role of a single large board or backplane in that all power and signalling would still be linked across the modular- or super-structure.

The inter-board link requirement would be satisfied by electronic and/or optical bridges instead of direct connectors. The bridges would comprise small PCBs with electrical and optical connectors to passively couple two or more sub-boards or backplanes together as described above. Such a bridge could for instance couple four sub-boards/backplanes together by being located on their four touching (or almost touching) corners.

There will be limits incurred to the maximum size of the modular electro-optical printed circuit board or super-backplane which will be determined primarily by the loss budget of the optical interconnects. This could be overcome by the means of ensuring sufficient signal strength or amplification across the extent of the super-backplane.

As mentioned above, in certain examples, it is preferred that the optical connectors be provided so as to enable flexibility and movement between adjacent optical interfaces. This can be achieved by providing an optical connector in which the rigid support layer of the PCB is removed at an edge portion of the component PCB 10 so as to leave only flexible optical layers. Some supporting structure would still be provided so as to ensure that the optical layers maintain roughly the required planarity with the remaining structure. Typically, flexible polyimide layers might be provided for the optical layers and these can be supported by one or more semi-rigid struts or buffers which allow some movement out-of-plane of the remaining PCB.

In the bridges described above, or indeed the connectors where no bridges are used, instead of passive connectors, active connectors might be provided which include optical transceivers for opto-electronic and electro-optic signal conversion and/or electronic or optical signal conditioning circuitry. The transceiver/conditioning circuitry could act as an optical repeater in which optical signals are converted to electronic signals, the electronic signals being processed by signal conditioning circuitry and the electronic signals then being reconverted to "clean" optical signals. Alternatively, they could serve as an optical amplifier, whereby either active or passive means of optical amplification are employed to boost an optical signal subjected to the typical loss mechanisms of a conventional optical waveguide interconnect.

Figure 6:
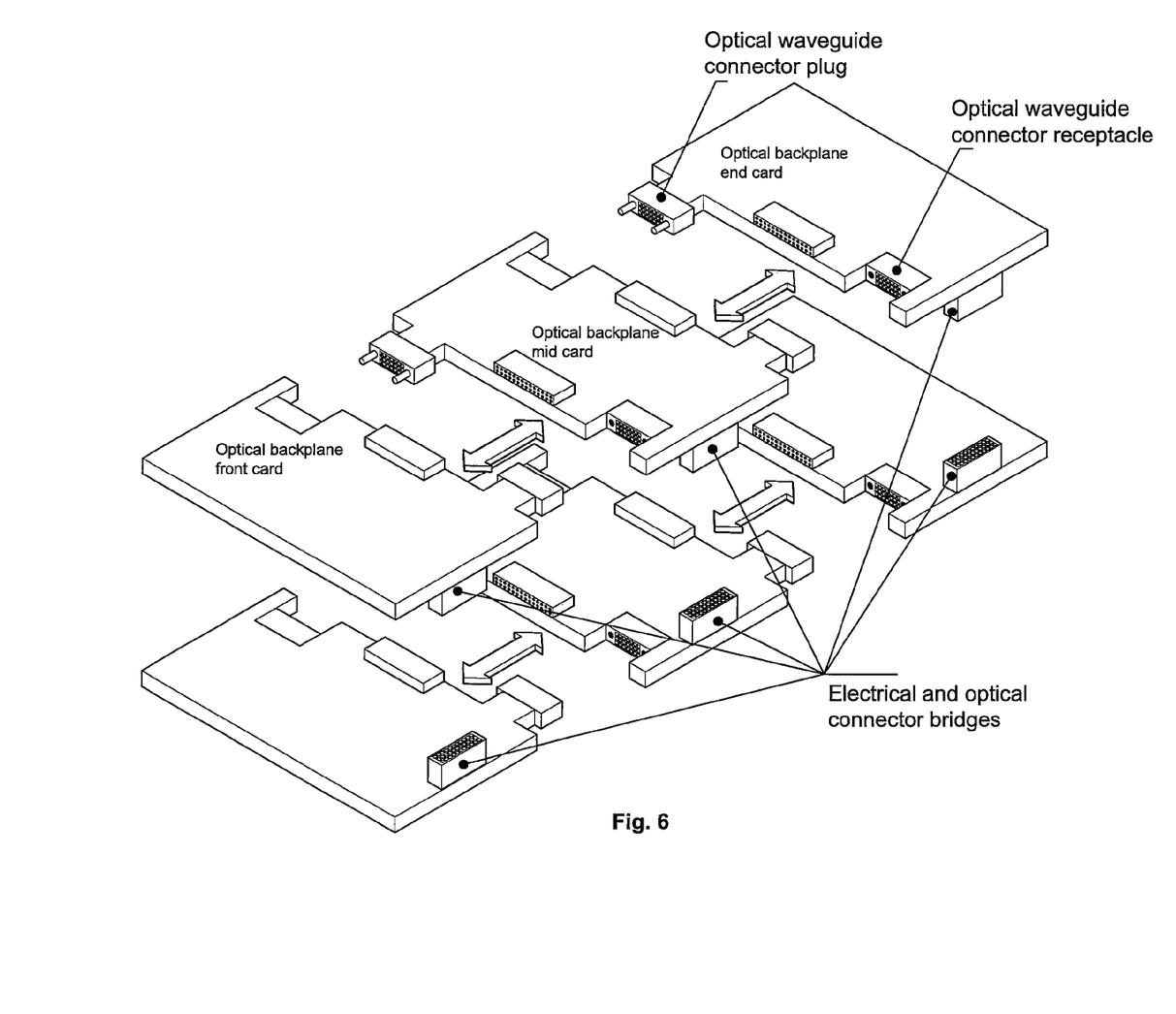
FIGS. 6 and 7 show a schematic representation of a 3 dimensional array of component PCBs.
Figure 7:
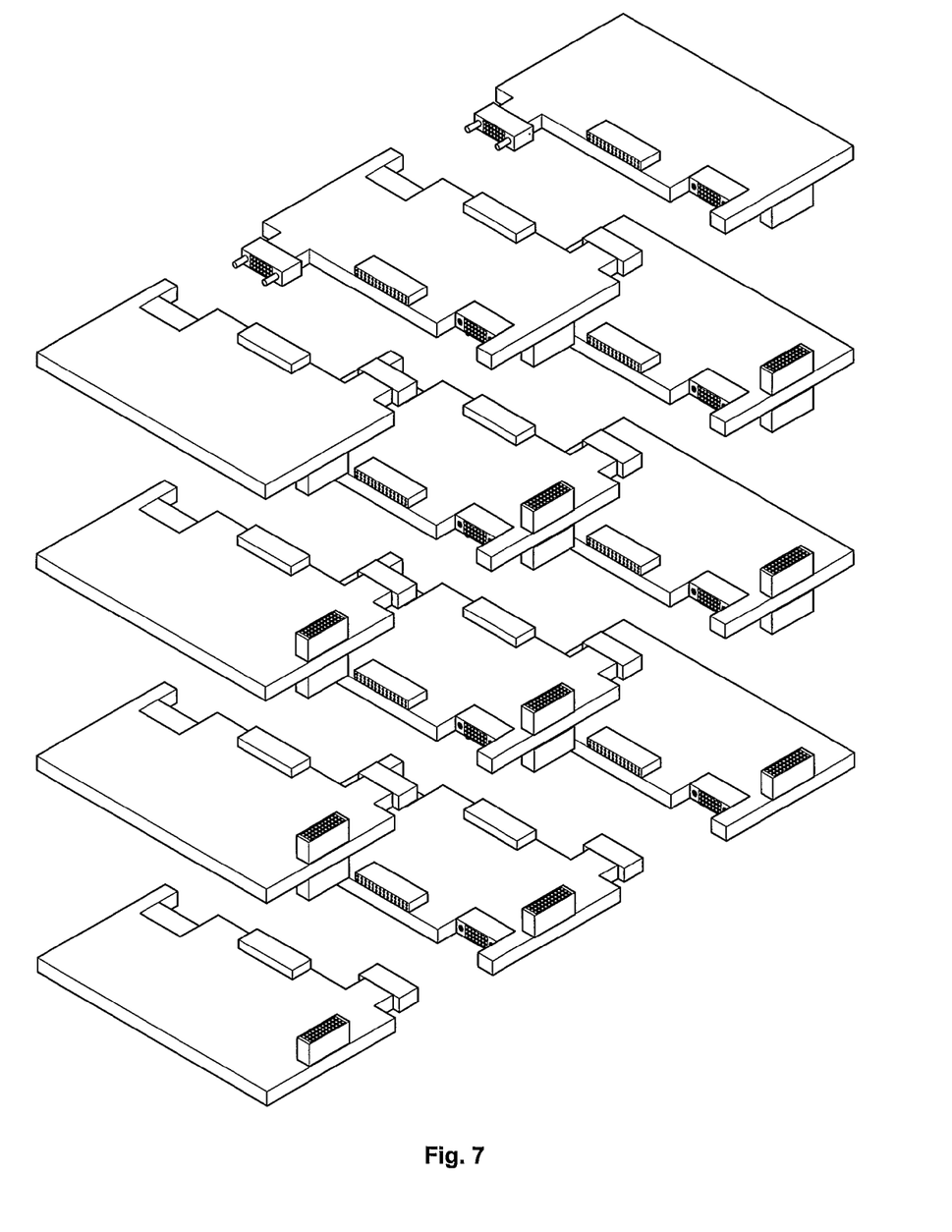

FIGS. 6 and 7 show a schematic representation of a 3 dimensional array of component PCBs. In general, it is understood that there are intrinsic fabrication limitations on the number of layers a PCB can have. Currently the limit is around 42. To address this and enable the number of layers in a PCB to be extended to any required number, connectors are hereby provided on a component PCB to enable connection between the component PCB and another in a different "vertical" plane, such that the resultant structure is a unitary logical single PCB but is made up of plural layers of components PCBs. Thus, as shown in FIG. 6, component PCBs are "stacked" over each so as to accommodate the intrinsic fabrication limitations on the number of layers a PCB can have. Orthogonal electro-optical bridges or orthogonal electro-optical connectors are provided to stack multiple component PCBs. In the example of FIGS. 6 and 7 2D super-backplanes are stacked by the use orthogonal electro-optical connectors into a 3D super-backplane.

To assemble such a super backplane or PCB, initially the component PCBs of each component super backplane or PCB are connected as described above with reference to, say, FIGS. 2, 2a and 3. Then, once these have been assembled, the 3-dimensional assembly may be performed by engaging the electro-optical bridges or orthogonal electro-optical on the respective super backplanes.

Referring again to FIG. 7, the component PCBs of the top layer only have orthogonal connectors on their bottom major surface. The component PCBs of the bottom layer only have orthogonal connectors on their top major surface. The two layers in between the top and bottom layers are made up of component PCBs that have orthogonal connectors on both major surfaces. Thus, the super structure is scalable and can be built to whatever size is desired or required.

Embodiments of the present invention have been described with particular reference to the examples illustrated. However, it will be appreciated that variations and modifications may be made to the examples described within the scope of the present invention.

The invention claimed is:

1. A component electro-optical printed circuit board backplane for assembly in a modular electro-optical backplane, the component electro-optical printed circuit board backplane comprising:
   optical channels for the propagation and transmission of optical data signals and electrical channels for the propagation and transmission of control signals;
   connectors for connection in plane to at least one other component electro-optical printed circuit board thereby to form a co-planar modular electro-optical backplane; and,
   at least one socket for receiving, in use, a user circuit in a plane orthogonal to the plane of the modular electro-optical backplane.

2. A component electro-optical printed circuit board backplane according to claim 1, wherein the connectors include:
   electrical connectors to enable power distribution and/or transmission of control signals between the component electro-optical printed circuit board and the at least one other component electro-optical printed circuit board to which in use it is connected; and;
   optical connectors to enable transmission of data signals between the component electro-optical printed circuit board and the at least one other component electro-optical printed circuit board to which in use it is connected.

3. A component electro-optical printed circuit board backplane according to claim 2, in which the electrical connectors are power and/or low speed connectors and/or the optical connectors are high speed connectors.

4. A component electro-optical backplane according to claim 1, comprising connectors for connection in plane to at least two other component electro-optical printed circuit boards.

5. A component electro-optical backplane according to claim 1, in which the connectors are arranged in use to connect directly to connectors on one or more adjacent component electro-optical printed circuit boards.

6. A component electro-optical backplane according to claim 1, in which the connectors are arranged in use to connect via connection bridges to connectors on one or more adjacent component electro-optical printed circuit boards.

7. A component electro-optical backplane according to claim 2, in which the optical connectors are passive optical connectors.

8. A component electro-optical backplane according to claim 2, in which the optical connectors are active optical connectors.

9. A component electro-optical backplane according to claim 1, in which the component PCB is substantially rectangular and connectors are provided on all four sides of the component PCB.

10. A component electro-optical backplane according to claim 1, in which the component PCBs are substantially rectangular and both optical and electrical connectors are provided on only two adjacent sides of the component PCB.

11. A component electro-optical backplane according to claim 1, in which the component PCBs are substantially rectangular and both optical and electrical connectors are provided on only three sides of the component PCB.

12. A component electro-optical backplane according to claim 1, in which the connectors arranged so as to enable formation of a two-dimensional array of component electro-optical printed circuit boards.

13. A storage assembly, comprising:
   a holding rack arranged to receive plural storage devices;
   a backplane arranged to interconnect the plural storage devices when received in the storage assembly, wherein the backplane is a modular backplane made up of plural component optical printed circuit boards, each of which is a component electro-optical printed circuit board backplane according to claim 1.

14. An electro-optical printed circuit board backplane, comprising plural component electro-optical printed circuit board backplanes according to claim 1, in which the electrical and optical connectors of one of the component electro-optical printed circuit boards are connected respectively to the electrical and optical connectors of another one of the component electro-optical printed circuit board backplanes.

15. A backplane according to claim 14, in which at least two of the adjacent plural component electro-optical printed circuit boards are connected to each other directly.

16. A backplane according to claim 14, in which at least two of the adjacent plural component electro-optical printed circuit boards are connected to each other with a connecting bridge.

17. A backplane according to claim 16, in which the bridge is an in-plane bridge or an out-of-plane bridge.

18. A first component electro-optical printed circuit board, such as a backplane, for assembly in a modular electro-optical backplane, the component electro-optical printed circuit board comprising:
   optical channels for the propagation and transmission of optical data signals and electrical channels for the propagation and transmission of control signals;
   connectors for connection orthogonally to at least one second component electro-optical printed circuit board, further comprising one or more connectors for connection in plane to at least one third component electro-optical printed circuit board, thereby to form a modular optical PCB including a co-planar modular electro-optical PCB, co-planar with the first component electro-optical PCB or the second component electro-optical PCB.

19. A component electro-optical printed circuit board according to claim 18, in which the component electro-optical printed circuit board is a component backplane and includes at least one socket for receiving, in use, a user circuit.

20. A component electro-optical printed circuit board according to claim 18, in which connectors are provided on both major surfaces.

21. A component electro-optical printed circuit board according to claim 18, in which the orthogonal connectors comprise one or more of electrical, electronic, optical connectors and/or electro-optical bridges.

* * * * *